United States Patent

[11] 3,629,003

| [72] | Inventor | Kiyoshi Suzuki<br>Tokyo, Japan |
|---|---|---|
| [21] | Appl. No. | 885,674 |
| [22] | Filed | Dec. 17, 1969 |
| [45] | Patented | Dec. 21, 1971 |
| [73] | Assignee | Toyoseito Kabushiki-Kaisha<br>Tokyo, Japan |
| [32] | Priority | Dec. 18, 1968 |
| [33] | | Japan |
| [31] | | 43/92779 |

[54] SUGAR PRODUCTS HAVING A COAGULATION PREVENTIVE PROPERTY AND SUPERIOR FLUIDITY
3 Claims, 1 Drawing Fig.

[52] U.S. Cl. .................................................. 127/30,
127/63, 252/383, 260/209 R
[51] Int. Cl. .................................................. C13f 3/00,
C13f 5/00
[50] Field of Search ........................................... 127/29, 30;
252/194, 381, 383

[56] References Cited
UNITED STATES PATENTS
2,818,356  12/1957  Shookhoff .................... 127/30
FOREIGN PATENTS
1,275,702  10/1961  France ......................... 252/383
OTHER REFERENCES
C.A. 53: 763 6g (1959).

*Primary Examiner*—Morris O. Wolk
*Assistant Examiner*—Sidney Marantz
*Attorney*—Linton & Linton

ABSTRACT: An intimate admixture of sugar and anhydrous calcium lactate with the anhydrous calcium lactate being mixed with the sugar at the end of the production of the sugar to prevent coagulation of the sugar and to improve its fluidity.

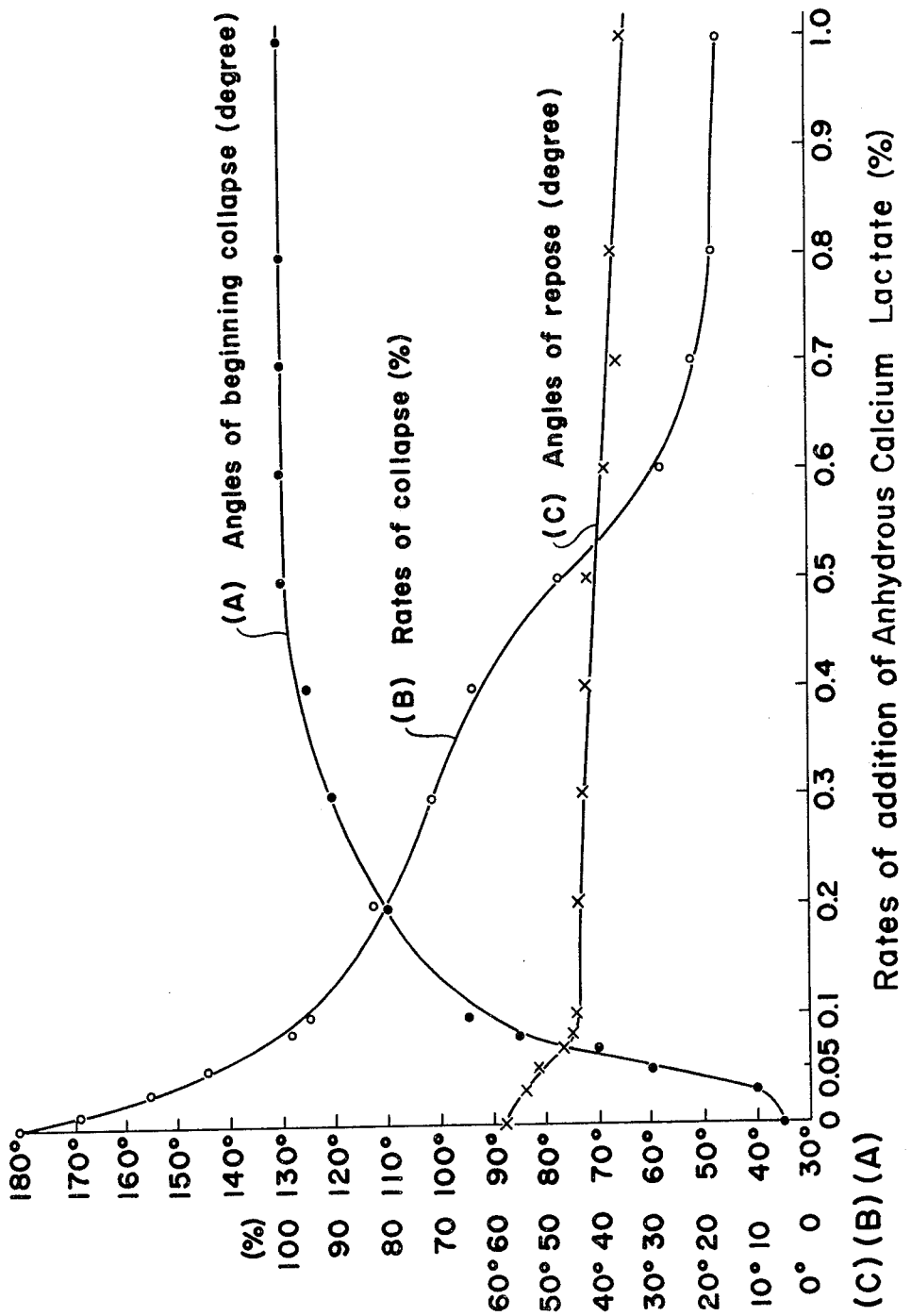

SUGAR PRODUCTS HAVING A COAGULATION PREVENTIVE PROPERTY AND SUPERIOR FLUIDITY

The present invention relates to means for preventing sugar, particularly granulated sugar or refined sugar from coagulation caused by atmospheric moisture absorbed therein, and also means for improving fluidity thereof.

It is an object of the present invention to provide means for preventing various kinds of sugar exposed in the normal atmosphere from coagulation caused by moisture present in said atmosphere.

It is accordingly another object of the present invention to provide means for preventing coagulation of sugar contained in dispensing containers having an opening for dispensing the same, said coagulation of sugar being caused by atmospheric moisture contained in said dispenser.

It is still another object of the present invention to provide means for the improvement in fluidity of sugar, which improvement in fluidity will contribute to easiness of dispensing or metering operation of sugar.

It is still another object of the present invention to provide means for preventing coagulation of sugar caused by moisture and which means may also improve the nutritive quality of sugar and will not injure its taste.

Further objects of the present invention and how the foregoing objects and advantages are attained will be apparent from the following description referring to the accompanying drawing.

The sole drawing is a graphic chart showing relations between ratio of mixing of calcium lactate anhydride in sugar and angles of beginning collapse, rates of collapse, and angles of repose respectively of the sugar product according to the present invention.

It is well known that sugar located in a container or at a location where it contact with air coagulate in absorbing atmospheric moisture. Such coagulation of sugar begins with partial liquefication of the faces of sugar crystals caused by moisture contained in sugar and also in the surrounding atmosphere. This partial liquefication causes saturated solution of sugar in between crystals. And, the saturated solution recrystallizes with change in temperature and other surrounding conditions. Gradually, are formed bridges which connect the crystals for causing firm blocks of sugar. When such phenomena are considerable, it is quite inconvenient for consumers to use the sugar for manufacturers of products using sugar to process the same products.

It is for certain that sugar can be prevented from coagulation if sugar is dried perfectly an anhydrous state and sealed to the atmosphere until use. However, such a treatment of sugar is far from the reality, and heretofore, various methods for preventing coagulation of sugar have been proposed in place of the above-mentioned impracticable treatment. One of such methods consists in that a substance having a property more hygroscopic than sugar is added in sugar so that fluidity of sugar may be kept by means of absorption of moisture by the additive. Another of such methods consists in utilizing lubricating property of a substance for sugar particles other than to utilize hygroscopic property of said substance. For such additives, corn starch, calcium phosphate and the like have heretofore been used in some industrial fields. And also, sodium phosphate (Japanese Pat. application publication No. 33-3014), acid salts of unsaturated fatty acid amine (Japanese Pat. application publication No. 33-3669), and derivatives of fatty acids such as condensation products of fatty acids and polyethylene polyamine (Japanese Pat. application publication NO. 37-1879) were proposed for such additives. Also various additives, hygroscopic property of which is as strong as that of sugar were proposed for table salt. However, such proposed additives for table salt cannot be applied to sugar because they essentially injure taste of sugar.

The requirements for an additive for sugar for preventing its coagulation are as follows: Its solubility in water must be complete. It must be neutral in aqueous solution so that it may not change color or taste of beverages in which sugar is dissolved. It must not injure taste of saccharic solution with its proper taste. It must not give chemical changes to compositions of tea, coffee or acid fruit beverages. It must be powerful in preventing coagulation of sugar even if it is used singly and at a very low rate. It must be a product which is being marketed in a large quantity and inexpensive. And, its use must be authorized under the Food Sanitation Law. Furthermore, it would be desirable that such an additive is not only harmless but nutritive in view of sugar being taken daily and in a large quantity by consumers.

From the view points stated above, I have made a search in and studied on many substances including the above-mentioned proposed additives, and realized that very few known substances might satisfy the foregoing requirements. Of the requirements, particularly, high coagulation preventive power in using singly and at very low ratio, easy procuration, and inexpensiveness are very important for the production and marketing of sugar. Through my search and study, have I found that anhydrous calcium lactate, when used singly and at proper rates satisfies all the foregoing requirements.

Products of sugar according to the present invention contain anhydrous calcium lactate of from 0.08–0.8 percent weight of weight of sugar mixed in sugar prior to packaging.

Calcium lactate $C_6H_{10}O_6Ca \cdot 5H_2O$ is known similar to calcium carbonate or the like, as an eutrophic, particularly for expectant and nursing mothers or infants. It is authorized under the Food Sanitation Law as an additive for enriched foods. And, it is known that if a sufficient amount of calcium lactate is added in table salt, sugar or the like, it improves in fluidity of these materials with its lubricating action and may also to a certain extent prevent coagulation of these materials. Calcium lactate has a strong solubility in water and is almost neutral in aqueous solutions. It is odorless and almost tasteless in dilute solutions. However, calcium lactate has never been used singly as an agent for the prevention of coagulation of sugar or the like, even though it has been used as an assistant agent for other means for preventing coagulation. In view of such a mode of use, it is apparent that only the lubricating property of calcium lactate has heretofore been utilized.

Anhydrous calcium lactate anhydride $C_6H_{10}O_6Ca$ which is the dehydrated product of calcium lactate $C_6H_{10}O_6Ca \cdot 5H_2O$ absorbs 0.41 times moisture of its own weight and returns to calcium lactate. It has been found in my experiments that this change of anhydrous calcium lactate into calcium lactate takes about 50 hours at temperatures of 15°–20° C. and a relative humidity of 90 percent. I have also found that anhydrous calcium lactate is quite useful for the prevention of coagulation of sugar and the improvement in its fluidity when it is used singly and at very low rates as will be stated below.

According to the present invention, anhydrous calcium lactate is added singly in sugar prior to packaging of sugar as stated in the foregoing. However, there is an indispensable range of addition rates which is relatively narrow. According to the present invention, the rates of addition of calcium lactate anhydride in sugar are between 0.08 percent and 0.8 percent. The ground of the range of addition is as follows:

In the graphic chart in the annexed drawing are shown results of my experiments, in which calcium lactate is mixed singly and at various rates in granulated sugar obtained at the end of production of sugar and prior to packaging. A 80 grams mixture of sugar and calcium lactate was put in a cylindrical container having a diameter of 5 cm. and a height of 10 cm. and left at room temperatures 15°≈20° C., for 10 days. Then, the container was inverted slowly at 180°. Curve A shows the angles at which collapse of the mixture begins in the invertion operation. Curve B shows the rates of collapse, or the rates of the collapsed portion to the whole mixture contained in the container at the end of the invertion operation. And, curve C shows the angles of repose of the mixture. The curves were plotted with mean values measured in the experiments. The curves A and B show the extent of coagulation of said mixture. And, the curve C shows the degree of its fluidity. As the contrast to the above experiments, the same granulated sugar, no additives being mixed, was subjected to the treatment as stated above. Then, the angle at which collapse begins was 180°, this means sugar in the cylindrical container did not begin collapsing until it was inverted completely. The rate of collapse B was 5 percent. The angle of repose C was 60°.

It will be realized from the results of my experiments as stated above, that at below the rate 0.08 percent of mixing of calcium lactate, the rates of collapse are very low, and these values are substantially similar to in the case in which no additive was mixed in sugar. And, in cases in which calcium lactate was mixed at rates over 0.08 percent, the rates of collapse B are improved considerably and the angles of beginning collapse are improved remarkably. And, as to the angle of repose C, it turns to be superior at about the rate 0.09 percent of mixing of calcium lactate anhydride. It is apparent that the higher the rate of mixing of calcium lactate, the better the above-mentioned A, B, and C.

Then, I made tests on the taste with 50 tester members. These members were given samples of sugar containing and not containing calcium lactate and without being informed as to the rates of mixing of the agent. Up to the rate 0.2 percent of mixing of the agent, most members felt the samples sweeter than sugar containing no agent. Over the rate 0.5 percent of mixing of the agent, a small number of the testers felt the samples a little peculiar to the taste of pure sugar, and over the rate 0.8 percent of mixing of the agent, most testers felt the samples to have a peculiar taste. And, further, over the rate 0.8 percent of mixing of the agent and when the mixture was dissolved in a beverage containing tannin, particularly such as tea, and the solution's temperature was lowered to below 60° C., it turned a little turbid, though it was kept clear at above 60° C. Accordingly, in considering consumers' eyesight, mixing of said agent over the rate 0.8 percent of mixing should be avoided.

As stated above, at the rate 0.08 percent of mixing of calcium lactate anhydride, not only coagulation preventive property and fluidity of sugar can be improved remarkably, but sugar increases in sweetness, and no drawback may be produced in using the mixture product. Up to the rate 0.3 percent, the aforementioned improvements are kept almost constant. So, practically, the optimum rate of mixing of the agent in sugar is within a range of $0.1 \approx 0.3$ percent. Because these rates are very low, to mix the agent in sugar does not substantially influence on increase in sugar's price.

The disclosure as set forth in the foregoing may be summarized as follows: When a very small amount of calcium lactate $C_6H_{10}O_6Ca$ is added in sugar, the additive keeps absorbing moisture present in and out of sugar during a considerably long time and turns into calcium lactate $C_6H_{10}O_6Ca \cdot 5H_2O$. During such lapse of time, the agent keeps having lubricating action so as to cause prevention of coagulation of sugar and improvement in its fluidity. And furthermore, at certain low rates of addition of the agent in sugar, not only the above-mentioned effects can be achieved but sweetness of sugar which is its most important property can be increased with only a nominal cost. As such is my disclosure, the present invention is very useful in the production, marketing and consumption of sugar.

Having thus described my invention, what is claimed for Letters Patent is:

1. An intimate admixture consisting of sugar and anhydrous calcium lactate, said anhydrous calcium lactate comprising 0.08–0.8 percent by weight of said sugar.

2. The product as in claim 1, wherein said sugar is granulated sugar.

3. Method of preventing the coagulating of sugar and improving its fluidity comprising adding to said sugar, between its production and packaging, anhydrous calcium lactate is the range 0.08–0.8 percent by weight of said sugar.

* * * * *